United States Patent [19]

Talamantez, Jr. et al.

[11] Patent Number: 5,267,779
[45] Date of Patent: Dec. 7, 1993

[54] PICK UP TRUCK CONVERSION DUMPING BODY

[75] Inventors: Rudolph Talamantez, Jr.; Rudolph Talamantez, Sr., both of Mt. Airy, Md.

[73] Assignee: R & D Unlimited, Inc., Carroll County, Md.

[21] Appl. No.: 836,359

[22] Filed: Feb. 18, 1992

[51] Int. Cl.$^5$ .................................................. B60P 1/24
[52] U.S. Cl. ...................................... 298/1 A; 298/12
[58] Field of Search ............ 298/1 A, 17 SG, 12, 298/17 B; 414/498

[56] References Cited

U.S. PATENT DOCUMENTS

| | | | |
|---|---|---|---|
| 1,389,642 | 9/1921 | George | 298/17 SG |
| 1,432,328 | 10/1922 | Gee | 298/12 |
| 1,533,419 | 4/1925 | Hug | 298/12 |
| 2,189,052 | 2/1940 | Anthony | 298/17 SG |
| 2,534,156 | 12/1950 | Wyatt et al. | 298/12 |
| 3,471,045 | 10/1969 | Panciocco | 298/1 A |
| 3,623,621 | 11/1971 | Tarrant, Sr. | 414/498 |
| 3,783,517 | 6/1973 | Luse | 414/498 |
| 3,868,088 | 2/1974 | Reeves | 414/498 |
| 3,915,496 | 10/1975 | Mobry, Jr. | 298/1 A |
| 4,090,623 | 5/1978 | Noyon | 414/498 |
| 4,239,430 | 12/1980 | Groene | 414/498 |
| 4,647,110 | 3/1987 | McKee | 298/1 A |
| 4,681,371 | 7/1987 | Leonard | 298/12 |

FOREIGN PATENT DOCUMENTS 1208137 2/1960 France ........................... 298/12
2619768 3/1989 France ........................... 298/12

Primary Examiner—David A. Bucci
Assistant Examiner—Gregory A. Morse

[57] ABSTRACT

A pickup truck conversion dumping body comprises two separate assemblies; one comprising of an open cargo box (Dumper) configured to accommodate pickup truck cargo bed; a companion assembly comprising of a track system with a movable carriage (Shuttle) which may be manuevered back and forth with a chain drive. The two assemblies are attached to one another with the cargo box body riding upon the carriage and attached to the carriage with connecting links. The carriage is arranged into the track system with caster means allowing it to ride in a horizontal position under normal operation. An escape pattern is provided with the track system, which allows the cargo box to be easily tilted. When the carriage has traveled a predetermined distance, the cargo box is then tilted downward by the force of gravity, causing its contents to be dumped. When the cargo box body is not needed for dumping purposes it may be disconnected from carriage and may be parked aside much like a Camper The track system may also be removed, for the operator will soon discover that the carriage shuttle within the track system may be used for other purposes, such as delivery and unloading lumber and machinery.

4 Claims, 6 Drawing Sheets

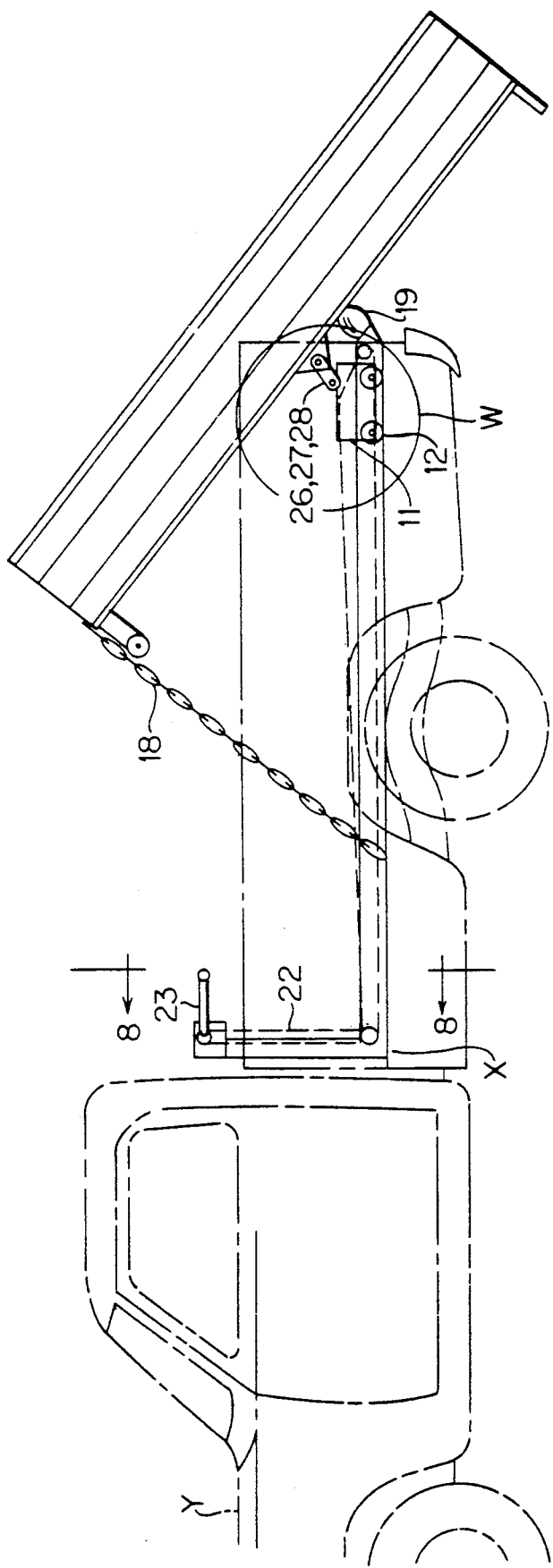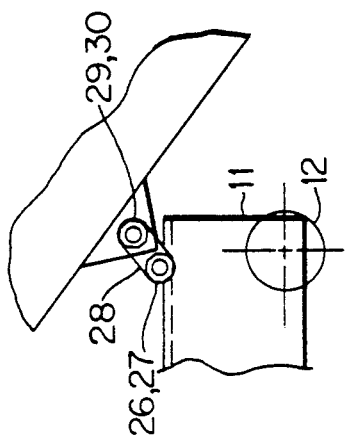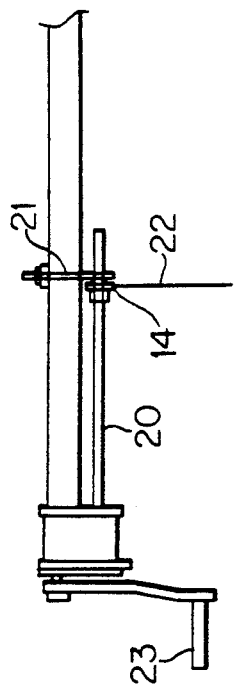

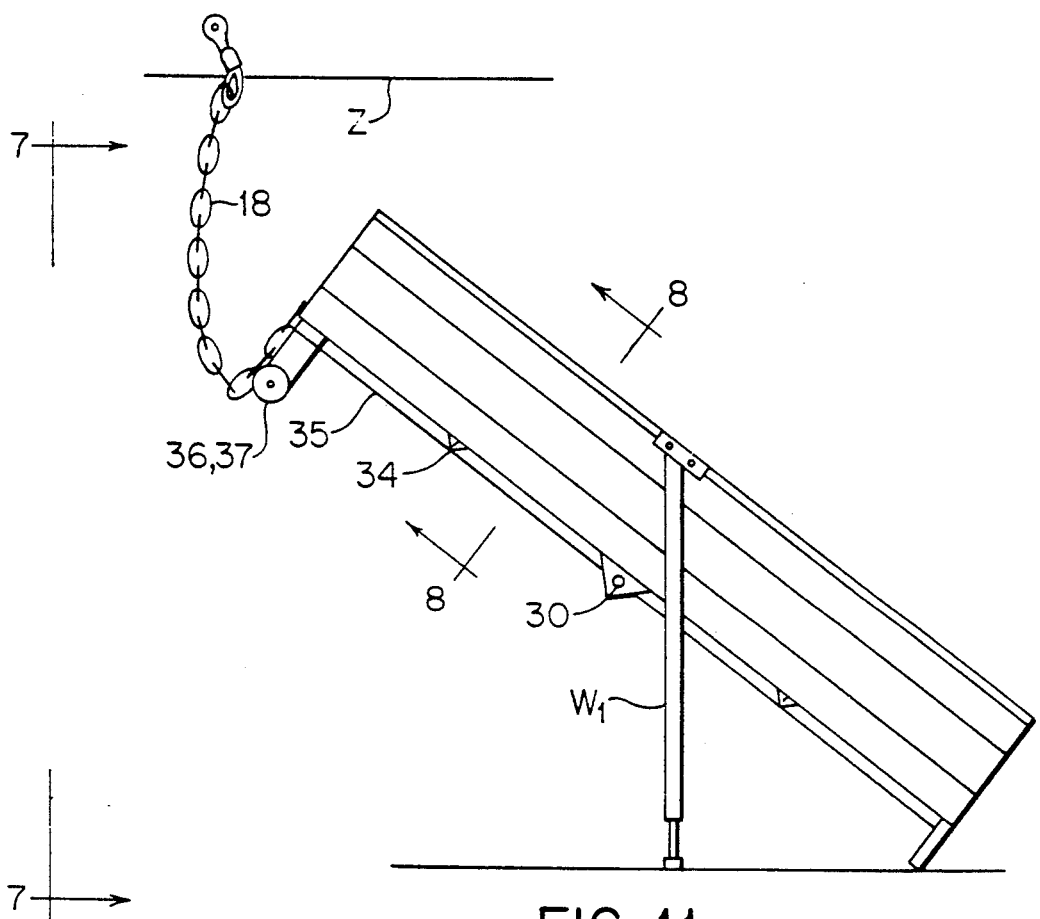
FIG. 11
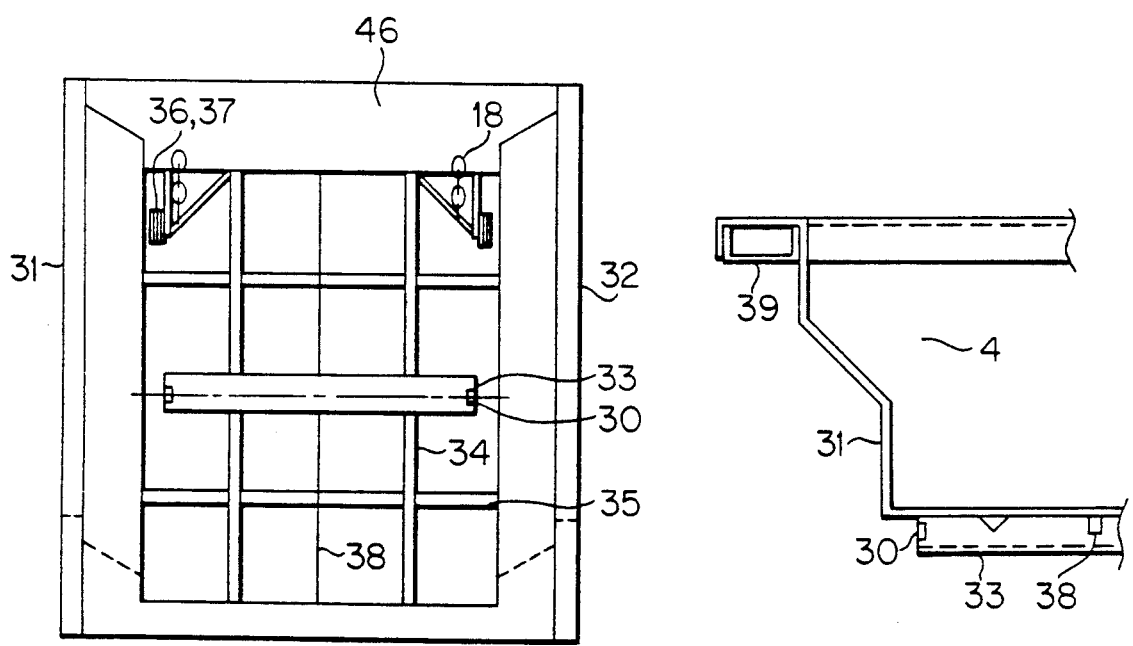
FIG. 12
FIG. 13

PICK UP TRUCK CONVERSION DUMPING BODY

BACKGROUND OF THE INVENTION

In general pickup truck conversion units (Dumpers) are employed in order to make the pickup truck more versatile. In the prior art, most dumpers are hydraulically operated and require frequent maintenance and are intended to be integrated with the pickup truck cargo bed hence it requires a permament installation; some of these units are extremely heavy and contribute to the use of excessive fuel during normal operations. Also in general they are not easily removable and cannot be parked aside much like a Camper when not needed.

DESCRIPTION OF PRIOR ART

Heretofore many conversion units (dumpers) have been proposed; however the main disadvantage that the present art presents is that of uneconomical operations. In addition to their initial installation charges, frequent maintenance of the hydraulic system is required in order to keep the unit in good operating order. Moreover, due to the nature of the design of these units they are not easily removable and have to be hauled everywhere empty when not in use contributing to the wastefulness of fuel. Furthermore when the present vehicle (pickup truck) is involved in an auto accident and has to be repaired, the dumper body unit must remain therein with the damaged pickup truck, and reinstalled at additional charges. If ever the dumper is damaged and needs repairs the parent vehicle is tied down and rendered inoperable until the dumper is repaired.

SUMMARY OF THE INVENTION

The difficulty with the prior art may be overcome in accordance with this invention; herein is presented a Dumper which is economical, requiring little maintenance without the use of an hydraulic system as its main source of operative force, and may be readily removed and parked aside when not needed. Further in accordance with this invention herein presented is a dumper which may be operated under normal conditions with use of a manually cranking device or a driving electric motor. Further in accordance with this invention herein presented is a dumper wherein the operation requires two separate assemblies; one such assembly arranged to fit within the parent vehicle cargo bed and the other assembly required to provide the driving mechanism required to manuever the dumper as is normal operation. The driving mechanism is comprised of a track system which is secured to the parent vehicle cargo bed with appropriate fasteners, clamps, etc.; the track system also contains an upright frame which is adopted to receive a cranking device, which is coupled with a driving chain. The chain is attached at one end around a sprocket and to a movable carriage also referred to herein as a shuttle. The other end of the chain is assembled around the driving sprocket and then to the carriage forming an elongated loop arranged in a longitudinal manner. A secondary looped driving chain is assembled about a secondary set of sprockets, one of which is also attached to a driving shaft which is an extension of the driving crank mechanism. The carriage is arranged to receive the dumper, also referred to herein as a cargo box, assembly in a piggyback mode attaching one assembly to the other with connecting links. The attachments of the connecting link are arranged to fit midway on the longitudinal length of the cargo box forming an evenly divided weighted configuration (much like a seesaw). The front end portion of the dumper assembly is fitted with a set of casters which keep the dumper in a horizontal mode, and this prevents premature dumping. The casters are in the track system independently; able to add support to the cargo box body when fully loaded. The track system is arranged to permit the casters to escape from the track system at a predetermined length allowing the cargo box to tilt downward causing the contents therein to dump out. The carriage is arranged to support the loaded dumper body by means of a plurality of heavy duty casters, which are arranged in the track system. When the operator desires to dump the contents within the cargo box, a crank mechanism is turned clockwise; this causes the shuttle to move back away horizontally from the stationary track system up to a point where predetermined escape means are provided in the track system which allows the cargo box to tilt downward. The operator will soon learn that the dumper must be loaded backheavy. Hence the pull of gravity will always tilt the cargo box downward, providing a foolproof method of operation. Once the contents have been spilled the operator may then return the cargo box dumper to a horizontal mode, and, by reversing the cranking operation, to bring the cargo box back into its normal position.

BRIEF DESCRIPTION OF THE DRAWINGS

FIG. 8 shows a side view of a first embodiment.

FIG. 9 shows the hand crank mechanism.

FIG. 10 shows the tilting mechanism on the carriage from a side view perspective.

FIG. 11 shows the cargo box standing alone from a side view.

FIG. 12 shows FIG. 11 from a rear view.

FIG. 13 shows a cross section of the cargo box.

DESCRIPTION OF INVENTION

Figure 1:
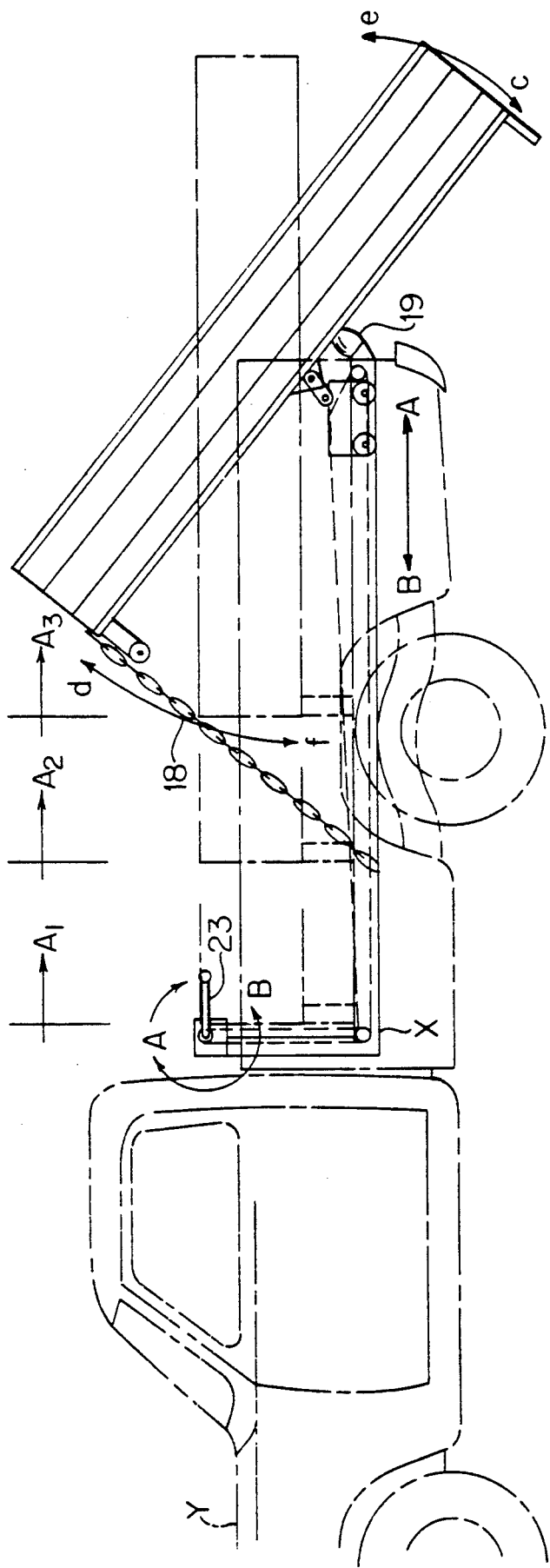
FIG. 1 shows a side view of a pickup truck mounted with the cargo box of the present invention.

To better understand this invention, refer to the figures herein enclosed outlining pertinent parts with numerical elements. FIG. 1 reveals a longitudinal view of the dumping unit in normal operation. To operate the cargo box the operator shall turn the crank mechanism clockwise in the direction of arrow A and the cargo box dumper will move away in the direction of A1 and in a horizontal direction A5. As the cranking continues the dumper will travel to Station A2 and then to Station A3, at which time the cargo box, being back-heavy and no longer counterbalanced by the casters, will rotate in the direction of "C" along the dumping end and in the direction of "D" along the front end of the dumper. The cargo box is restrained at the end of the downward fall by means of shock absorbers 19 and in other models a heavy duty link chain 18 will also restrain the dumper. The cargo box is then returned to its normal horizontal position in a ready for use condition by pulling the cargo box downward in the direction "f" along the front of the cargo box and at the same time the rear part will rise into a horizontal mode, Direction "e". The cargo box will then be cranked in the direction B and it will travel horizontally in the direction B1. "Y" denotes the parent vehicle and "x" denotes the standard hardware required to fasten the entire unit to the cargo bed of the parent vehicle.

Figure 2:
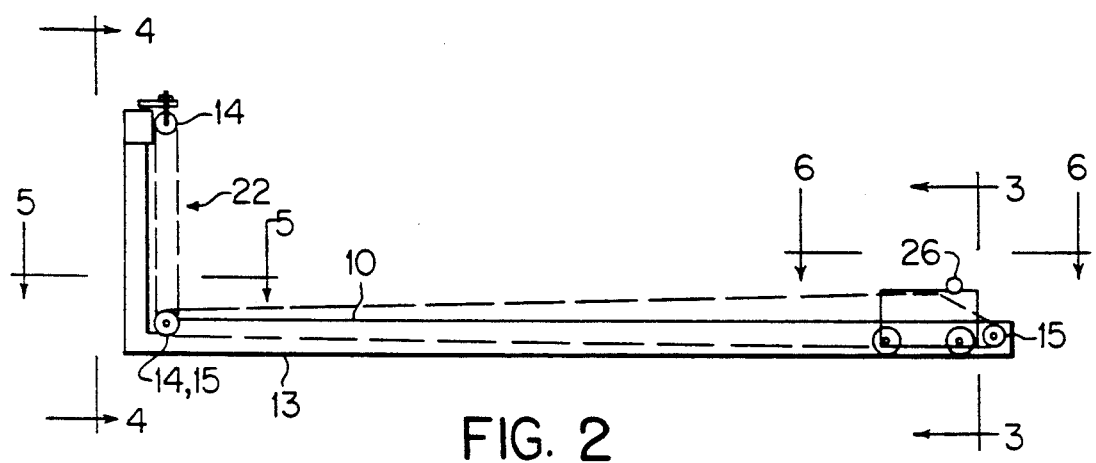
FIG. 2 shows a side view of the carriage drive mechanism.
Figure 3:
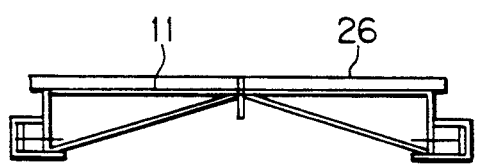
FIG. 3 shows an end view of the carriage structure.
Figure 4:
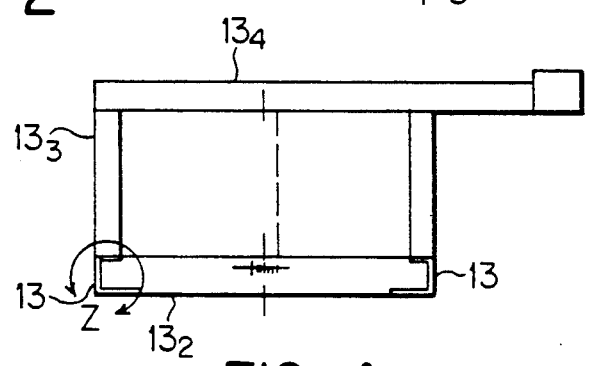
FIG. 4 shows a view of the frame.
Figure 5:
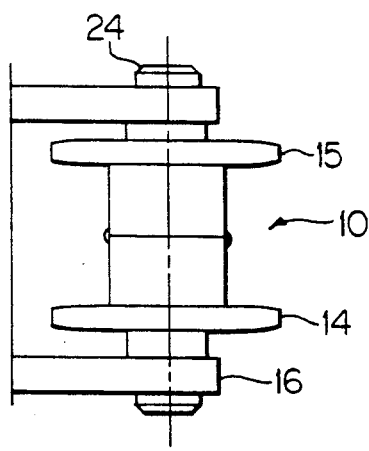
FIGS. 5 and 6 show views of the sprocket mechanism.
Figure 6:
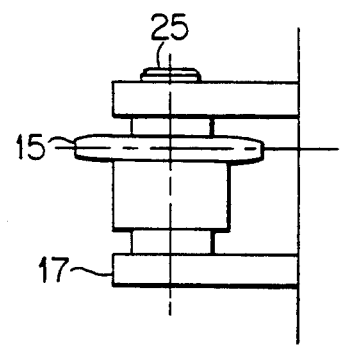
Figure 7:
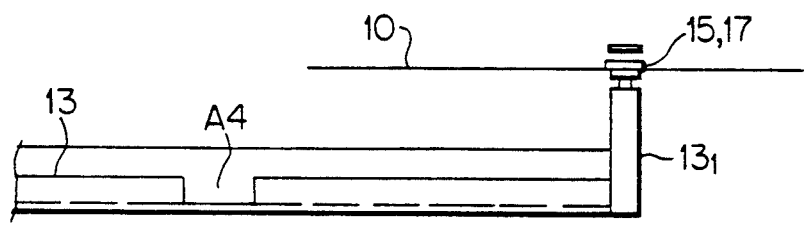
FIG. 7 shows a top view of the escapement opening.
Figure 18:
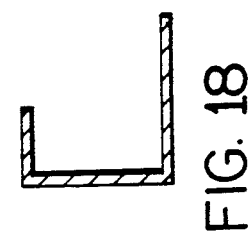
FIG. 18 shows a cross-sectional view of one of the parallel rails.

FIG. 2 reveals a longitudinal view of the track system also referred as a sub base. It is composed of a rectangular frame which is arranged with two parallel channel Track 13, said channel track having one flange larger than the other as shown in FIG. 18 which is an enlargement of channel track 13. 13-1 is the front support means of the frame, 13-2 is the rear means support of the frame, 13-3 is the upright support means of the frame, 13-4 is the upper support means of the frame where, additionally, it supports the crank mechanism 23 as shown in FIG. 1 and FIG. 9. Along the parallel channel track system 13, there resides a cutaway portion A4, along the uppermost part of the track 13, as shown in FIG. 7. Additionally, along the parallel channel track system 13 resides movable carriage 11, FIG. 3 with a plurality of caster wheels 12 which are arranged along the channel track system 13. This shuttles 11 is attached at one end with a looped chain 10 which provides the motive means. The chain 10 is looped around companion sprockets 14 and 15. FIG. 5. A secondary looped driving chain 22, FIG. 9 is arranged around a secondary set of sprockets 14. FIG. 3 reveals construction features of the front end of frame 13-1 through 13-4 and it takes a cross-section along cutting plain arrows 3-3. FIG. 5 reveals sprocket drive mechanism 14 and 15 which are attached to carriage 11. It is taken along the cutting plain arrows 5—5 a view looking downward and traversely across the parallel channel track 13. FIG. 6 reveals the opposite end of the drive mechanism which anchors the looped chain 10. It is taken along cutting plain arrows 6—6, looking downward.

FIG. 8 reveals the longitudinal view of the first embodiment whereby the cargo box (FIG. 11) is shown in the dumping position. A portion of the cargo box (FIG. 11) is restrained in the tilted position by means of link chain 18, and in another arrangement, bumper 19 may also be employed depending upon the operation, light and heavy duty models.

FIG. 9 reveals the hand driving mechanism 23; it is taken along cutting plain arrows 9—9. The driving shaft 20 is coupled to sprocket 14, and it is supported at the opposite end by adjusting means 21. A secondary driving chain 22 is mated at the opposite end in conjunction with FIG. 5. The tilting mechanism is shown in an enlarged detail FIG. 10 and it is an enlargement within the circle "W", the cargo box. FIG. 11 is attached to carriage 11 by connecting link 28 which is mated to companion part 26 which is an integral part of the carriage 11. 27 is the attaching nut means at the other end of the connecting link 28 which is attached to mated part 30 with fastener 29.

FIG. 11 reveals the cargo box showing its major elements in a longitudinal view, in a standing alone mode in a tilted position. The cargo box is arranged of two identical formed sheets of steel 31 and 32, each sheet bent and configured with 6 bends meeting one another along the center 38 shown in FIG. 13 where they are arranged to form a trough-like inseparable assembly, mated at one open end of the trough like assembly as a companion part 46 is arranged and at the other end a removal part, or tail gate 42 is arranged as shown in FIG. 5. The two sheets 31 and 32 are then reinforced with companion elements 33, 34 and 35; additionally, a set of caster wheels 36 are provided to retain the cargo box in a horizontal position during the normal operation. FIG. 12 reveals the underside construction of the cargo box which is taken along the cutting plain arrows a-2-a-2 of FIG. 11. FIG. 13 reveals a cross-sectional end view of the cargo box; it is taken along the cutting plain a-1-a-1 of FIG. 11. 39 provides support means along the outer edges where subjected abuse may be minimized. The link chain 18 may be used to prop up the cargo box when not in use; one end of said chain may be anchored to plain "Z". As an optional mode a set of legs W-1 may be provided.

Figure 14:
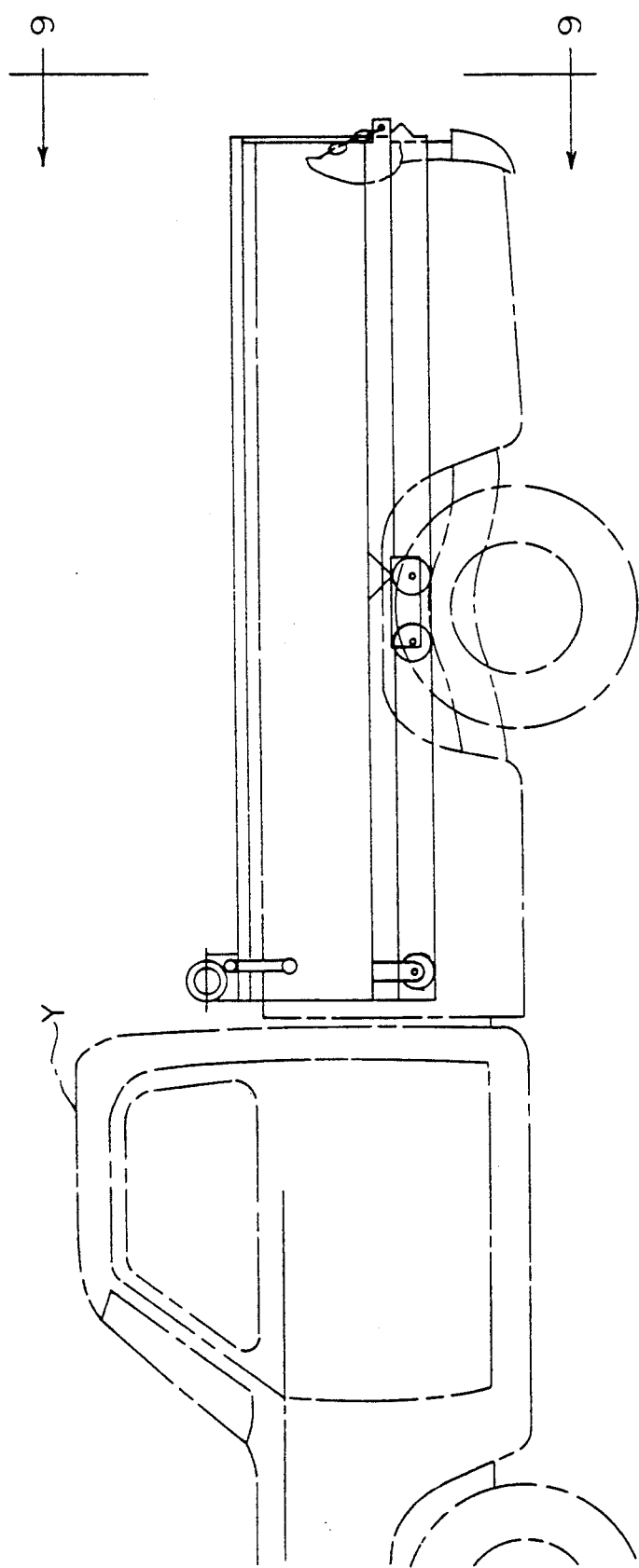
FIGS. 14, 16 and 17 show the invention in a transport position.

FIG. 14 reveals the entire assembly of the first embodiment of this invention, shown in a longitudinal and horizontal mode in conjunction with its parent vehicle "Y", as represented by FIG. 1 and FIG. 11.

Figure 15:
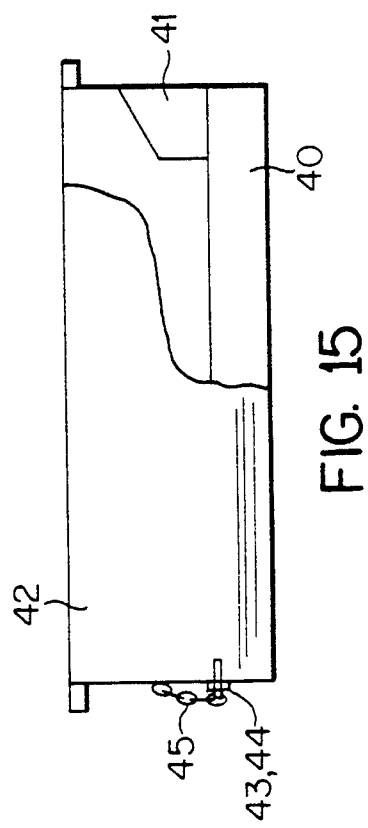
FIG. 15 shows the dump body from a side view.
Figure 16:
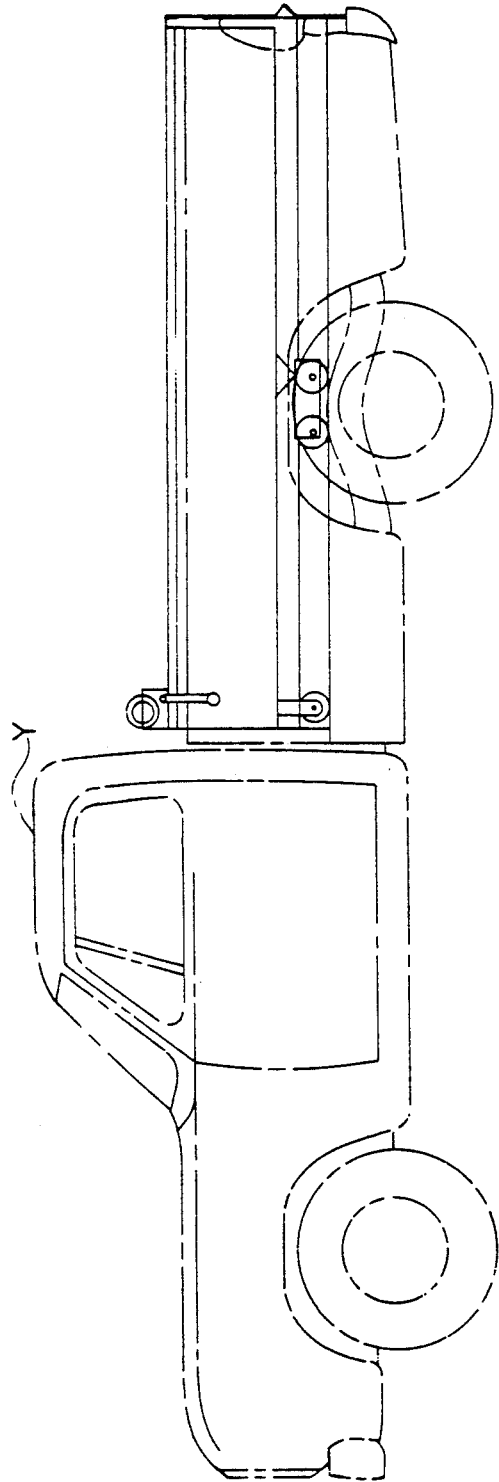
Figure 17:
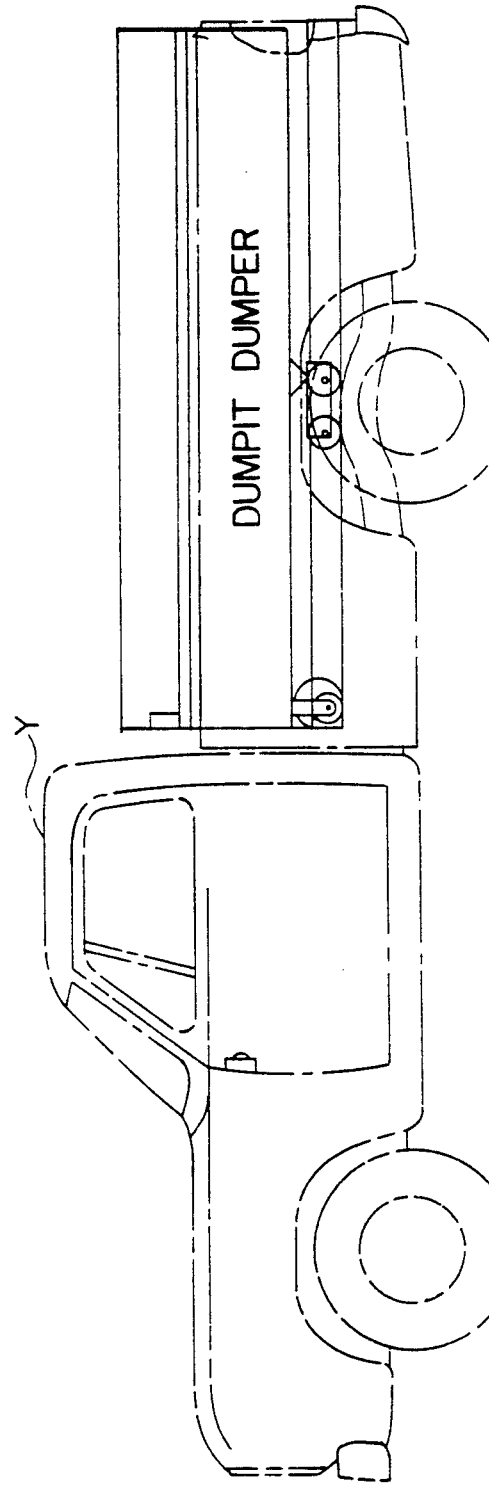

FIG. 15 reveals the features of the tailgate 42. It is taken along the cutting plain arrows 9—9, 40 and 41 represents the other nd reinforcement means, 43 a locking plug, 44 a locking pin, and 45 a keeper chain means. FIG. 16 represents a longitudinal view of the entire first embodiment of this invention, represented by the parent vehicle "Y" the cargo box, FIG. 11 and additionally showing, in FIG. 17 modifications which may be required for the conversion into 12 volts D. C. operation, Heavy Duty.

Although this invention has been fully described with respect to the first and second embodiments, many other variations will become apparent, such as to name a few, a trailer concept, and a van concept, will become apparent to those who are skilled in the art. It is herefore the intention that these appended claims be interpreted as broadly as possible in view of the prior art to include variations and modifications.

What I claim is:

1. A pickup truck conversion dumping unit comprising:
    a channel track system having two parallel rails, said channel track system being located on the rear of a pickup truck, wherein said rails each comprise a top surface and a bottom surface and wherein said rails have a longest dimension corresponding to the length of the cargo bed along the longitudinal axis of said truck;
    a cargo box having a bed capable of carrying a load of material and having a transport position in which said bed is parallel to the plane of the rails and a dumping position in which said bed is at an angle to the plane of the rails;
    a carriage mounted to both of said rails by at least two wheels per rail, whereby said carriage is movable relative to said rails in a direction parallel to said longest dimension of said rails;
    a drive means for moving said carriage relative to said rails in said direction parallel to said rails;
    means for rotatably mounting said cargo box to said carriage such that said cargo box may rotate relative to said carriage about a horizontal axis perpendicular to said direction of motion of said carriage relative to said rails;

two wheels mounted to said cargo box at a location distant from said carriage, each corresponding to a respective one of said parallel rails and suitable for movement between said top and bottom surfaces of said rails in said direction parallel to said rails;

wherein said top surface of each of said rails has an escapement opening greater in length than the diameter of said two wheels mounted to said cargo box, the length of the opening being measured in said direction parallel to said rails; and wherein said wheels mounted to said cargo box are held between said top and bottom surfaces of said rails during the movement of said cargo box from said transport position to said dumping position over a distance in said direction parallel to said rails, thereby preventing said cargo box from rotating about said horizontal axis, and subsequently said wheels mounted to said cargo box pass through said escapement opening in the respective said top surface, thereby allowing said cargo box to rotate about said horizontal axis.

2. A pickup truck conversion dumping unit as in claim 1 wherein said drive means for moving said carriage relative to said rails comprises a looped chain driven by a hand crank.

3. A pickup truck conversion dumping unit as in claim 1, wherein said carriage comprises a pair of parallel planar vertical members connected by a planar horizontal member, said wheels mounted said carriage to said rails being mounted on a lower part of said vertical members, and wherein said carriage further comprises a pair of brace members connected between the mid point of said horizontal member and a respective lower extremity of said vertical members, each brace member being connected to a separate one of said vertical members.

4. A pickup truck conversion dumping unit as in claim 1, wherein the means for rotatably mounting said cargo box to said carriage comprises a removable connecting link and pin.

* * * * *